H. W. & W. D. ROOS.
CLAMPING MECHANISM.
APPLICATION FILED MAR. 25, 1916.
1,209,761.
Patented Dec. 26, 1916.
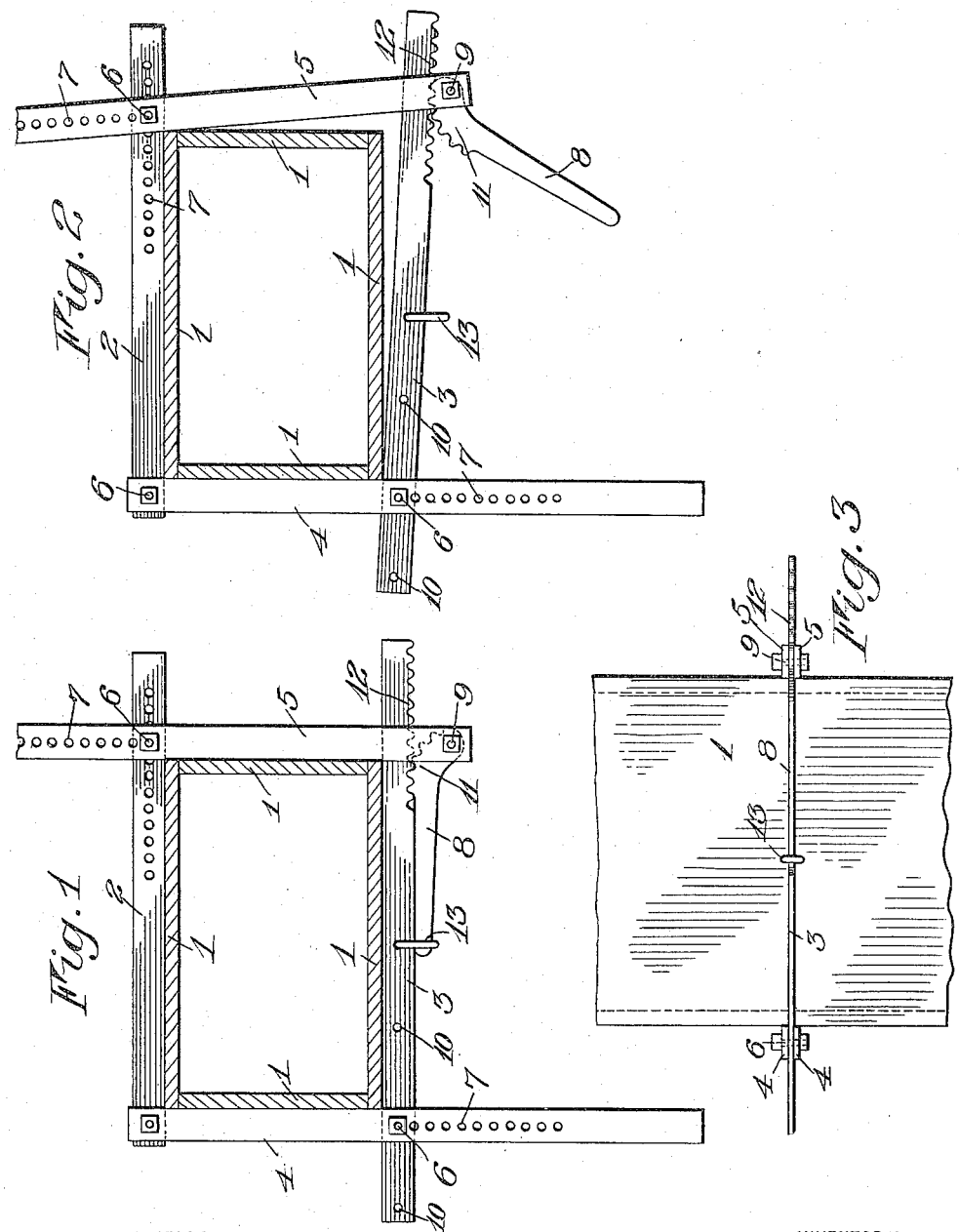
WITNESSES:
INVENTORS
Henry W. Roos
William D. Roos
BY
their ATTORNEYS

UNITED STATES PATENT OFFICE.

HENRY W. ROOS AND WILLIAM D. ROOS, OF CINCINNATI, OHIO.

CLAMPING MECHANISM.

1,209,761.  Specification of Letters Patent.  Patented Dec. 26, 1916.

Application filed March 25, 1916. Serial No. 86,751.

*To all whom it may concern:*

Be it known that we, HENRY W. Roos and WILLIAM D. Roos, both of Cincinnati, in the county of Hamilton and State of Ohio, have invented certain new and useful Improvements in Clamping Mechanism; and we do hereby declare the following to be a full, clear, and exact description of the same, reference being had to the accompanying drawings, forming a part of this specification, and to the reference-numerals marked thereon.

Our invention pertains to a clamping mechanism, and is allied more closely with the type of structure that is generally employed for holding in place column forms where these are to be filled with concrete or other material, embodying generally a plurality of relatively movable members which are brought into clamping relation with the parts which they surround, and held fixed in such position, and the purpose of the present improvement is to afford a clamp consisting of a minimum number of parts, which serves adequately to carry out in a most efficient manner the purposes for which it is designed.

In a more specific aspect, the invention may be said to reside in the provision of improved means for bringing the clamping members into their clamping relation, and further in locking them after they are once adjusted so as to hold the inclosed parts rigidly, while at the same time permitting of readily separating the clamping members when they are to be removed.

To these and other ends the invention consists in certain improvements and combinations of parts, all as will be hereinafter more fully described, the novel features being pointed out in the claims at the end of the specification.

In the drawings: Figure 1 is a horizontal sectional view of a column form showing the application of a clamp embodying our present improvements, the relatively movable clamping members appearing in operative relation; Fig. 2 is a similar view showing the position of the clamping members prior to their being tightened about the form, and Fig. 3 is a side elevation.

Similar reference numerals in the several figures indicate the same parts.

The invention is susceptible of other applications than that which is about to be described, and may in fact be variously adapted in connection with any clamping mechanism involving a pair of relatively movable or adjustable clamping members, and requiring means for bringing them into clamped relation, and retaining them in such relation in engagement with the parts to be held.

For the purposes of illustrating the invention, we have shown it in one of its preferred forms in which it may be used for retaining column forms in position, and in the present structure, 1 designates the column form that is to be retained by the clamping mechanism, which will now be fully explained. The structure includes a pair of clamping members 2 and 3, each consisting of a single bar or strip which are movably associated with coöperating clamping members designated at 4 and 5, and each consisting of a pair of bars or strips, pivotally associated with the first mentioned clamping members by means of bolts 6.

The clamping members 2, 4 and 5 are provided at one end with a series of openings or perforations 7 by means of which various adjustments may be obtained by locating the bolts 6 in any one of the various openings, and the clamping member 3 is also provided with openings or perforations 10, by means of which various adjustments may be obtained by locating the bolt 6 in one of said openings, and by engaging the toothed segmental portion 11 of the operating device 8, in any one of the various teeth of the toothed portion 12 the clamp may be fitted to any desired cross sectional form within the limits of its dimensions.

It will be observed that the clamping members 3 and 5 are separable, and one of the separable members is provided with an operating device arranged for coöperation and locking engagement with the other of the separable clamping members in order to effect the desired adjustment and to retain the parts in adjusted relation. To this end, according to the present embodiment, we employ an operating device designated at 8, and preferably comprising a lever pivotally mounted between the bars of the clamping member 5 by means of a bolt 9. The operating device 8 includes a toothed segmental portion 11 arranged to engage a rack or toothed portion 12, formed upon the end of the clamping member 3, which is located between the opposite bars of the clamping member 5 when in adjusted relation. When the mechanism is applied to a column form, or other structure, it initially assumes a position somewhat similar to that illustrated in Fig. 2. With the parts in this relation, upon moving the operating device or lever 8 inwardly or toward the clamping member 3, it produces a combined movement of the clamping members 3 and 5 in a direction more or less at right angles to each other, that is to say, the clamping member 5 is moved longitudinally of the clamping member 3, and the latter is moved longitudinally of the clamping member 5, this double action being due to the pivotal motion of the operating device about its axis and to the engagement of the toothed segmental portion with the correspondingly toothed part on the coöperating clamping member 3. The operating device is moved inwardly until the clamping members are brought into just the desired relation with the column form, as indicated in Fig. 1, and suitable provision is made for holding the clamping members in their adjusted position. In the present instance, this is accomplished by employing a strap 13 which is pivotally attached on the clamping member 3, so as to engage the end of the lever 8 in the manner indicated in Fig. 1, and prevent its outward movement.

We claim as our invention:

1. A column clamp including a pair of separable members, one of which is provided with a series of rack teeth and an operating lever pivotally mounted on the other of said members and including a toothed segmental portion having engagement with the aforesaid teeth for effecting bodily movement of the clamping members at substantially right angles to each other.

2. A column clamp including a pair of separable members adapted to be arranged at right angles to each other, one being provided with a series of rack teeth extending upon opposite sides of the other member when in assembled relation, and an operating lever pivotally mounted upon the last mentioned member including a curved tooth portion having engagement with the aforesaid teeth on the other member and operating to progressively engage said other member with a positive locking action.

HENRY W. ROOS.
WILLIAM D. ROOS.

Witnesses:
LOUISE E. SAMPSON,
J. SAGMEISTER.

Copies of this patent may be obtained for five cents each, by addressing the "Commissioner of Patents, Washington, D. C."